(12) United States Patent
Spielmann et al.

(10) Patent No.: US 7,806,200 B2
(45) Date of Patent: Oct. 5, 2010

(54) POWER TOOL WITH A SLIP CLUTCH

(75) Inventors: David Spielmann, Pfaeffikon (CH);
Othmar Gerschwiler, Ulisbach (CH);
Armin Breitenmoser, Wattwil (CH);
Remo Breitenmoser, legal representative, Wattwil (CH)

(73) Assignee: Hilti Aktiengesellschaft, Schaan (LI)

( * ) Notice: Subject to any disclaimer, the term of this patent is extended or adjusted under 35 U.S.C. 154(b) by 223 days.

(21) Appl. No.: 12/004,379

(22) Filed: Dec. 19, 2007

(65) Prior Publication Data

US 2008/0210450 A1 Sep. 4, 2008

(30) Foreign Application Priority Data

Dec. 21, 2006 (DE) .................... 10 2006 000 545

(51) Int. Cl.
*B23C 9/00* (2006.01)
(52) U.S. Cl. ............... 173/176; 173/178; 173/104; 173/109; 192/86.26; 192/110 R
(58) Field of Classification Search ............. 173/178, 173/176, 109, 104; 192/54.1, 55.1, 55.5, 192/55.6, 56.1, 56.2, 89.26, 110 R; 464/48
See application file for complete search history.

(56) References Cited

U.S. PATENT DOCUMENTS

| | | | | |
|---|---|---|---|---|
| 2,778,246 A * | 1/1957 | Thornton | ............... | 475/241 |
| 4,263,996 A * | 4/1981 | Putney | ............... | 192/56.57 |
| 4,606,443 A * | 8/1986 | Kimura | ............... | 475/263 |
| 4,760,904 A * | 8/1988 | Heiskell et al. | ............ | 192/56.5 |
| 5,458,206 A | 10/1995 | Bourner et al. | | |
| 6,112,873 A * | 9/2000 | Prasse et al. | ............. | 192/69.83 |
| 6,142,242 A * | 11/2000 | Okumura et al. | ............... | 173/48 |
| 6,142,243 A * | 11/2000 | Mayer | ............... | 173/176 |
| 6,213,695 B1 * | 4/2001 | Breitenmoser | ............... | 409/231 |
| 6,688,406 B1 * | 2/2004 | Wu et al. | ............... | 173/48 |
| 6,691,796 B1 * | 2/2004 | Wu | ............... | 173/48 |
| 6,892,827 B2 * | 5/2005 | Toyama et al. | ............... | 173/48 |
| 7,168,503 B1 * | 1/2007 | Teng | ............... | 173/48 |
| 7,360,607 B2 * | 4/2008 | Aeberhard | ............... | 173/176 |
| 7,455,123 B2 * | 11/2008 | Aeberhard | ............... | 173/178 |
| 2006/0207775 A1 * | 9/2006 | Armstrong | ............... | 173/1 |
| 2009/0078524 A1 * | 3/2009 | Christensen et al. | ............... | 192/55.1 |

FOREIGN PATENT DOCUMENTS

| | | |
|---|---|---|
| EP | 1524083 | 4/2005 |
| JP | 5443398 | 4/1979 |

* cited by examiner

*Primary Examiner*—Rinaldi I. Rada
*Assistant Examiner*—Michelle Lopez
(74) *Attorney, Agent, or Firm*—Abelman, Frayne & Schwab

(57) ABSTRACT

A power tool includes an output member (8) projecting from the tool housing (4), a drive (6) located in the housing for rotating the output member (8), and a slip clutch (22) for transmitting torque from the drive (6) to the output member (8) and including a plurality of clutch elements (24) retained against rotation relative to the housing (4), a plurality of separate spring elements (28) for adjustable preloading the clutch elements (24) against the counter-clutch elements (51) of the control element (18) for retaining the control element (18) against rotation upon application of the torque thereto until threshold of the torque is reached, and a common support element for supporting the spring elements and movable relative to the housing (4).

7 Claims, 2 Drawing Sheets

POWER TOOL WITH A SLIP CLUTCH

BACKGROUND OF THE INVENTION

1. Field of the Invention

The present invention relates to a power tool including a housing, an output member projecting from the housing, a drive located in the housing for rotating the output member about an axis, and a slip clutch for transmitting torque from the drive to the output member. The slip clutch has a plurality of clutch elements retained against rotation relative to the housing, a control element having a respective plurality of counter-clutch elements cooperating with the plurality of clutch elements, and a plurality of separate spring elements for preloading the clutch elements against the counter-clutch elements of the control element. Thereby, the control element is retained against rotation upon application of the torque thereto until threshold of the torque is reached. A rotatable adjustment element adjusts the preload applied by the spring elements.

2. Description of the Prior Art

In the power tools of the type described above, at a certain resistance torque applied to the output member, transmission of a driving torque, which is produced by the tool drive, to the output member is interrupted in order to prevent any damage. In this power tool, the use of a plurality of separate spring elements insures retaining of a uniform spring characteristic during the service life of the tool to a most possible extent. Thereby, the torque transmission, at a predetermined threshold of the torque, is always interrupted at substantially the same actual torque during the service life of the power tool.

European Patent EP 0 613 758 B1 discloses a power tool with a clutch mechanism with a plurality of helical springs the first ends of which applies pressure to a spherical clutch element, and the second ends of which are supported against a clutch ring. For adjusting the preload against the clutch element, the axial position of the clutch ring is adjusted by rotating the clutch ring. The helical springs project in bores formed in the housing and are associated with respective clutch elements.

The drawback of the known clutch mechanism consists in the large number of separate elements, which increases manufacturing and assembly costs.

Accordingly, an object of the present invention is to provide a power tool in which the drawbacks of the known power tool is eliminated.

Another object of the present invention is to provide a clutch for a power tool and having a stable spring characteristic at a simple construction of the clutch.

SUMMARY OF THE INVENTION

These and other objects of the present invention which will become apparent hereinafter, are achieved by providing a common support element for supporting the spring elements and movable relative to the housing. This permits to handle all of the spring elements together, independently of the tool housing. This provides, on one hand, for a simple assembly, with the spring elements and the common support element forming a sub-assembly produced separately from the remaining portion of the power tool. On the other hand, in the mounted condition, the spring elements can be associated with a member which is not fixedly secured to the housing or forms a part thereof. This, e.g., provides for a constructively simple approach to the adjustment of the preload applied by the clutch elements.

According to a particularly advantageous embodiment of the present invention, the support element is formed as a guide frame rotatable relative to the housing by the control element. Thereby, the spring elements are displaced together with the adjustment element when it is adjusted relative to the housing, whereby a constructively simple adjustment of the preload of the spring elements became possible.

Advantageously, the guide frame has first and second guide parts displaceable relative to each other in the axial direction, and the spring elements are supported at one of their opposite ends against the first guide part and at another of their opposite ends against the second guide part. Thereby, the spring elements are located in a closed member the axial extent of which, however, can be changed in order to adjust the preload applied by the spring elements to different values.

Advantageously, there is provided an end position of the two parts in which the first guide part abut, in the axial direction, the second guide part. Thereby, the slip clutch can be locked, if needed, to prevent, in certain applications, an undesirable interruption in transmission of a torque from the drive to the driven member.

Advantageously, the first and second guide parts are formlockingly connected with each other for joint rotation in a rotational direction. Thereby, spring elements can be used which have a smaller stiffness in a direction transverse to the axial direction, such as helical springs. The formlocking, in the rotational direction, connection between the two parts insures that no side deviation or tilting of spring elements takes place during rotation of the two parts.

Further, to provide for a relative displacement of the first and second guide parts, one of the first and second guide parts is provided with axially extending guide webs and another of the first and second guide parts is provided with complementary, axially extending, guide receptacles. However, the guide webs can be provided only in one part or in both parts, with the receptacles being provided in another part or, likewise, both parts.

In a particularly advantageous embodiment of the present invention, an intermediate disc, which is displaceable in an axial direction but is retainable against rotation, is provided between the support element and the clutch elements. This insures that only axial compression stresses are applied to the clutch elements. Frictional stresses, which are produced by rotation of the support element, are transmitted to the intermediate disc that is supported against the tool housing in the rotational direction.

It is advantageous when the support element and the adjustment element are formlockingly connected with each other for joint rotation in a rotational direction. This provides for a direct force transmission from the adjustment element to the support element, so that the tool construction can be simplified. Simultaneously, in this way, upon adjustment of the adjustment element, the preload is indirectly adjusted.

The novel features of the present invention which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENTS

Figure 1:
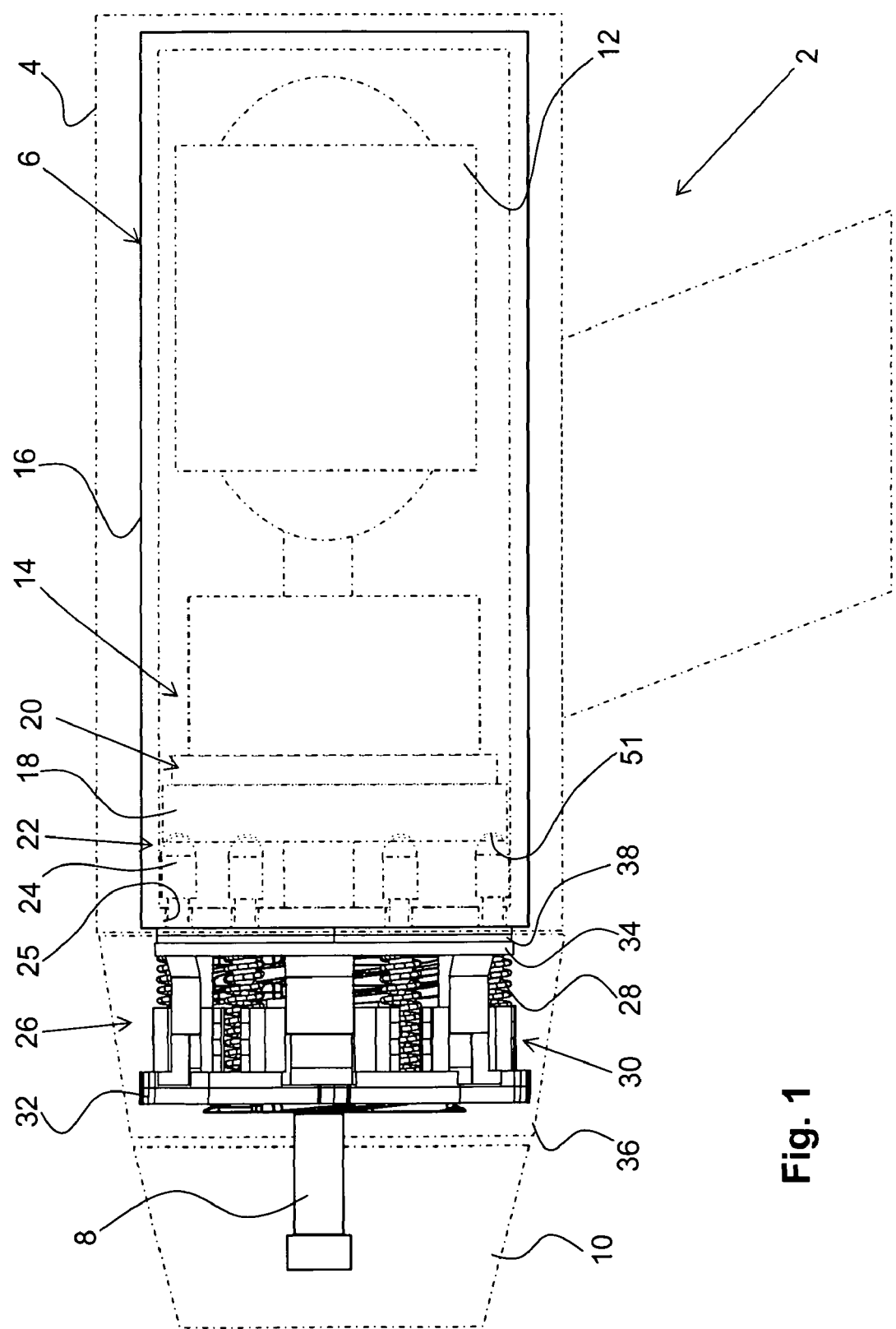
FIG. 1 a partially cross-sectional side view of a power tool according to the present invention.

An electrically driven power tool 2 according to the invention, which is shown in FIG. 1, is formed, e.g., as a screwdriving tool. The power tool 2 has a housing 4 in which a tool drive, which is generally designated with reference numeral 6 is located. The drive 6 applies a torque to a spindle-shaped driven member 8. On the driven member 8, there is supported a working tool receptacle 10 such as, e.g., a drill chuck which is rotated by the drive 6 about an axis A. The drive 6 includes a motor 12 and a transmission mechanism 14 both located in a drive housing 16 fixedly secured in the tool housing 4.

The drive 6 further has a control element 18, e.g., in form of a planetary gear ring that cooperates with a schematically shown gear means 20, e.g., in form of a stage of planetary gears.

Between the control element 18 and the drive housing 16, there is provided a slip clutch that is generally designated with a reference numeral 22. The clutch 22 has a plurality of clutch elements 24, e.g., in form of pins, balls, or their combination. The clutch elements 24 are preloaded in the axial direction against the control element 18 and are axially displaceable. However, the clutch elements 24 are retained against rotation in receiving bores 25 of the drive housing 16. The preload of the clutch elements 24 is effected with a spring device 26 that includes a plurality of spring elements 28 in form of helical springs.

The spring device 26 is formed as a pre-assembled unit and includes a support element 30 on which all of the spring elements 28 are supported parallel to each other. The support element 30 is formed as a two-part guide frame having first guide part 32 and second guide part 34 axially displaceable relatively to each other but without a possibility of rotation to each other. The extending parallel to each other, spring elements 28 are supported at their respective opposite ends against the first guide part 32 and at the second guide part 34.

The first guide part 32 connects the support element 30, in a manner not shown in detail, with a sleeve-shaped adjustment element 36 for joint rotation in a rotational direction D about an axis A. The adjustment element 36 is rotatably supported on the tool housing 4 and serves for adjusting the preload of the clutch elements 24 with the support element 30. The preload is applied to the clutch elements 24 by the second guide part 34 via an intermediate disc 38.

Figure 2:
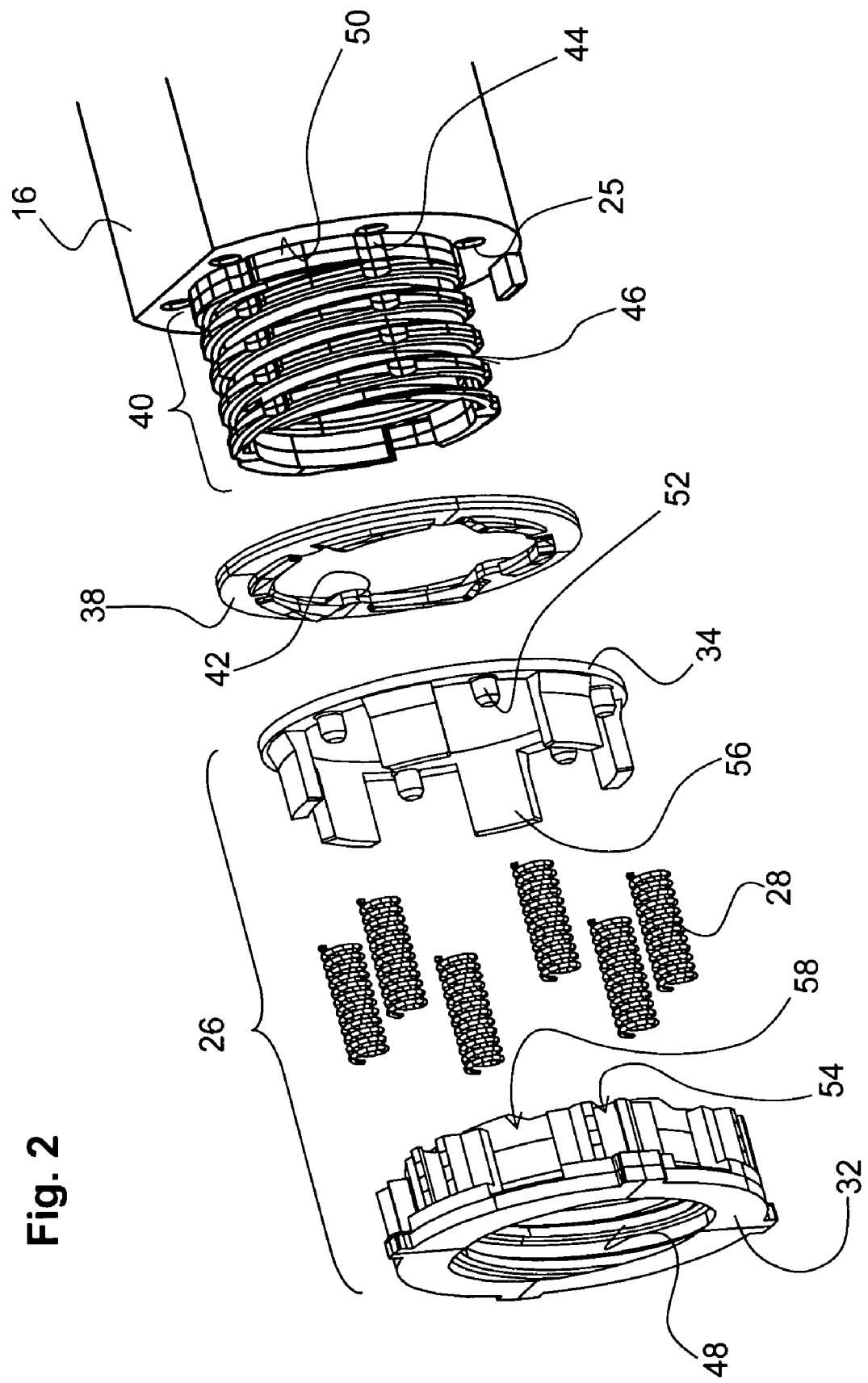
FIG. 2 an exploded perspective view of a spring device.

As shown in FIG. 2, the intermediate disc 38 is formed as an annular disc and is pushed over a neck 40 of the drive housing 16. Upon the intermediate disc 38 being pushed over the neck 40, lugs 42 of the intermediate disc 38, which extend radially inwardly, engage in correspondingly positioned elongate grooves 44 which are formed in the neck 40 and which extend parallel to the axis. This insures an axial displacement of the intermediate disc 38 but prevents rotation of the intermediate disc 38 relative to the drive housing 16 or the tool housing 4.

The drive housing neck 40 is provided with an outer thread 46 that cooperates with an inner thread 48 provided on the first guide part 32. Upon rotation of the adjusting element 36, the spring device 26, which is connected with the adjusting element 36 via the first guide part 32, also rotates relative to the drive housing 16. Due to the cooperation of the outer thread 46 with the inner thread 48 of the first guide part 32, the first guide part 32 is also displaced axially relative to the drive housing 16. Thereby, an axial distance between the first and second guide parts 32, 34 is adjusted. The second guide part 34 is supported at that via the intermediate disc 38 against an end side 50 of the drive housing 16 in which the receiving bores 25 for the clutch elements 24 are formed. Thereby, the preload, which is produced by the spring device 26, is adjusted by changing the distance between the first and second guide parts 32 and 34.

With the adjustment of the preload applied by the spring device 26, a threshold of a torque, which is transmitted from the drive 6 to the driven member 8 is determined. Upon reaching this threshold, the clutch elements 24 are displaced against the adjusted preload out of the counter-clutch elements 51 which are formed, e.g., as pockets in the control element 18. The clutch element 24 are pushed through the receiving bores 25, whereby they displace the intermediate disc 38 against the preload of the spring device 26 and disengage from the counter-clutch elements 51. As a result, the control element 18 rotates relative to the drive housing 16, so that the transmission of the torque from the drive 6 to the driven member 8 of the transmission mechanism 14.

As shown in FIG. 2, the first and second guide parts 32, 34 have, for positioning of the spring elements 28, centering cams 52 that are insertable in the spring elements 28, and receiving means 54 into which the spring elements 28 are partially insertable. Guide webs 56 project from one of the first and second guide plates 32, 34 in axial direction. The webs 56 cooperate with likewise axial extending guide receptacles 58 to provide for a formlocking connection of the two guide parts 32, 34 to insure their joint rotation in the rotational direction D, on one hand and, on the other hand, to insure their axial displacement relative to each other. All this insures that the spring elements 28 are deformed only axially.

The axial extension of the guide webs 56 and the guide receptacles 58 are so selected that the guide parts 32, 34 directly abut each other in an end position, independent of the spring elements 28, forming a hard stop with respect to each other. In this end position, the clutch elements 24 are secured in their engagement position with the counter-clutch elements 51. As a result, no interruption in the transmission of the torque takes place when the threshold of the torque is exceeded. This means that in this position the function of the slip clutch 22 is disabled.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A power tool, comprising a housing (4); an output member (8) projecting from the housing (4); a drive (6) located in the housing (4) for rotating the output member (8) about an axis (A); and a slip clutch (22) for transmitting torque from the drive (6) to the output member (8), wherein the slip clutch (22) has a plurality of clutch elements (24) retained against rotation relative to the housing (4), a control element (18) having a respective plurality of counter-clutch elements (51) cooperating with the plurality of clutch elements (24), a plurality of separate spring elements (28) for preloading the clutch elements (24) against the counter-clutch elements (51) of the control element (18) for retaining the control element (18) against rotation upon application of the torque thereto until the threshold of the torque is reached, an adjustment element (36) for adjusting the preload of the spring elements (28), and a common support element (30) for supporting the spring elements (28) and movable relative to the housing (4), wherein the support element (30) is formed as a guide frame rotatable, together with the spring elements (18), relative to the housing (4) by the adjustment element (36).

2. A power tool according to claim 1 wherein the guide frame has first guide part (32) and second guide part (34) displaceable in an axial direction relative to each other, and wherein the spring elements (28) are supported at one of opposite ends thereof against the first guide part (32) and at another of the opposite ends thereof against the second guide part (34).

3. A power tool according to claim 2, wherein the first guide part (32) abut, in the axial direction, the second guide part (34) in an end position thereof.

4. A power tool according to claim 2, wherein the first and second guide parts (32, 34) are formlockingly connected with each other for joint rotation in a rotational direction (D).

5. A power tool according to claim 4, wherein for a relative displacement of the first and second guide parts (32, 34), one of the first and second guide parts (34) is provided with axially extending guide webs (56) and another of the first and second guide parts (32) is provided with complementary, axially extending, guide receptacles (58).

6. A power tool according to claim 1, wherein an intermediate disc (38) displaceable in an axial direction but retainable against rotation, is provided between the support element (30) and the clutch elements (24).

7. A power tool according to claim 1, wherein the support element (30) and the adjustment element (36) are formlockingly connected with each other for joint rotation in a rotational direction.

\* \* \* \* \*